May 24, 1966 W. E. GOETZ ETAL 3,253,257

CHARACTER RECOGNITION EMPLOYING PARTIAL SUPERPOSITION OF IMAGES

Filed Sept. 19, 1962 2 Sheets-Sheet 1

INVENTORS

WILLIAM E. GOETZ

PHILIP H. HOWARD

BY K. P. Johnson

ATTORNEY

May 24, 1966 — W. E. GOETZ ETAL — 3,253,257

CHARACTER RECOGNITION EMPLOYING PARTIAL SUPERPOSITION OF IMAGES

Filed Sept. 19, 1962 — 2 Sheets-Sheet 2

United States Patent Office 3,253,257
Patented May 24, 1966

3,253,257
CHARACTER RECOGNITION EMPLOYING PARTIAL SUPERPOSITION OF IMAGES

William E. Goetz, Endicott, N.Y., and Philip H. Howard, Rochester, Minn., assignors to International Business Machines Corporation, New York, N.Y., a corporation of New York Filed Sept. 19, 1962, Ser. No. 224,612
14 Claims. (Cl. 340—146.3)

This invention relates generally to apparatus for identifying recorded indicia and more particularly to apparatus for determining the identity of indicia by detecting characteristics unique to their respective images.

Portions of the apparatus herein described have been described and claimed in an application for Letters Patent by E. C. Greanias and A. Hamburgen, filed December 30, 1957, bearing Serial No. 706,087, now Patent No. 3,105,956, issued October 1, 1963.

A machine recognition system often employed to determine the identity of recorded indicia such as printed alphabetic or numeric characters is that of optically scanning an indicium by a transverse row of photoelectric transducers. This identification system is reliable, capable of high speed operation, and well adapted to handling large volumes of printed data. Identification of the unknown indicia is accomplished by sensing the location of discrete areas of the printed lines composing the indicium and comparing the sensed pattern of areas in a storage device, such as a matrix, against the criteria of known characters. The identity of the unknown pattern of sensed areas is determined when it meets the unique criteria or pattern of a known indicium.

The conversion of printed indicium lines into a plurality of electrical signals by the scanning transducers may be done either dynamically or statically. When the indicium is identified dynamically the unknown indicium or its image is moved past a row of transducers which produce varying output signals in accordance with the quantity of light striking each transducer. These signals are usually gated into a storage matrix in synchronism with the movement of the indicium past the transducers. Static indentification is achieved by providing a two dimensional matrix of transducers and projecting an image of the unknown indicium thereon. The pattern of those transducers signalling the presence of the dark image areas may then be stored and compared with the patterns of known indicia.

In order to reliably sense an indicium with this system, a character area approximately twice the height of the recorded indicium must be constantly scanned by the photo-electric transducers. The reason for scanning the extra record area is to insure that the entire printed character will be scanned even though it may be printed above or below the designated position. The variation in vertical positioning of the character is due to the several tolerances permitted within the printing mechanism, document feeding mechanism and alignment of the sensing device. Decreasing these tolerances would add a substantial burden to the manufacturing cost of the printing and processing machines. As a result of the large scanning area, the number of transducers required is also appropriately increased to scan an individual indicium. Since the recorded indicium is approximately half the height of the scanned character area, the storage matrix employed need have only a number of horizontal rows equal to the number of transducers actually sensing the recorded indicium. Therefore, the outputs of the transducers are coupled together in pairs of mixing circuits. Thus, for example, if a row of eighteen transducers was necessary to scan a moving indicium of height equivalent to the scan of nine transducers, nine output signals would be available to the storage matrix by coupling transducers 1 and 10, 2 and 11, 3 and 13, etc. together.

In addition to requiring channel mixing circuits to reduce the number of output channels from the transducers, variable resistors are required in the output circuit of the transducers in each pair and each resistor must be properly adjusted to insure that the sensitivity of one transducer in the pair is equal to that of the other. The incorporation and adjustment of these variable resistors creates a significant additional expense in the cost of the identification apparatus and decreases the reliability thereof because of the added components.

Accordingly, it is an object of this invention to provide an indicium recognition device for recorded indicia which has scanning apparatus enabling a reduction in the quantity of photoelectric transducers heretofore required.

Another object of this invention is to provide a recognition device for recorded indicia having scanning apparatus which eliminates the requirement of mixing circuits used in conjunction with photoelectric transducers.

Another object of this invention is to provide recognition apparatus for recorded indicia having an optical system for superimposing predetermined portions of a record character area during indicium scanning.

Still another object of this invention is to provide indicium scanning apparatus which includes a biprism to reduce by at least half, the document character area required to be sensed by transducers.

Yet another object of this invention is to provide optical scanning apparatus for use in conjunction with an indicium recognition machine which is less expensive and more convenient than conventional scanning equipment.

A still further object of this invention is to provide novel scanning apparatus for an indicium recognition machine which is compatible with existing machines.

In accordance with the foregoing objects this invention provides means for transporting a document so that indicia recorded thereon within designated character areas are moved successively into alignment with lens means. Means are provided to illuminate the character areas and indicia therein to enable the lens means to form images of the indicia, preferably magnified, on a plurality of photoelectric transducers which provide electrical signals representative of unknown indicium images. Positioned within the image path are optical means which superimpose predetermined portions of the projected character areas scanned by the lens means to reduce one dimension of the original magnified character areas without altering the magnification of the lens means. The electrical signals provided by the transducers are supplied to identification apparatus where the signals are compared with the criteria of known indicia images and the unknown images are identified.

By reducing the number of transducers necessary to scan a character area and eliminating the mixing circuits for coupled transducers, there is advantageously eliminated the need for critical balancing of sensitivity between coupled transducers. Furthermore, the partial superimposition of character areas through the use of a biprism also avoids alteration of the magnification obtained with the lens system, and the biprism may be located either before or after the lens in the optical path of the scanning apparatus.

The foregoing and other objects, features and advantages of the invention will be apparent from the following more particular description of the preferred embodiment of the invention as illustrated in the accompanying drawings.

Figure 3:
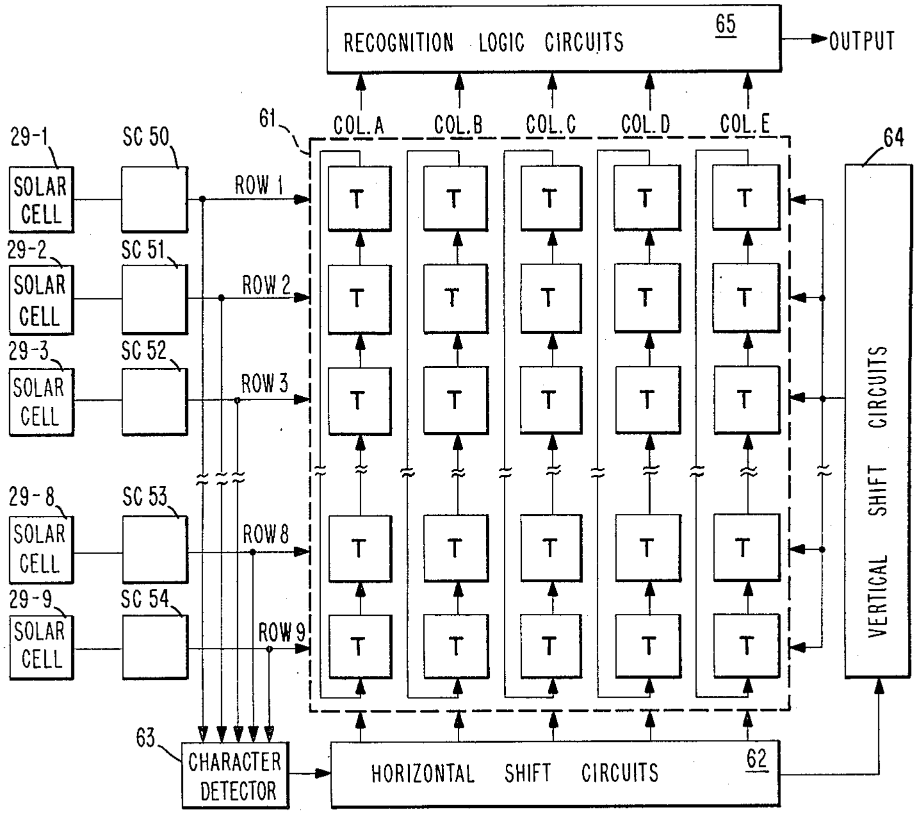
FIGURE 3 is a diagrammatic illustration of an indicium identification system and storage matrix with which the scanning apparatus of the invention may be used.
Figure 4:
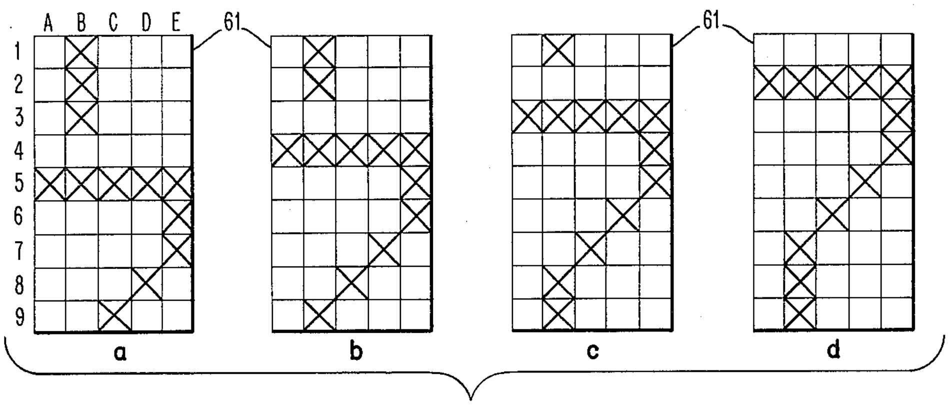

FIGURE 4, items *a* through *d*, shows a symbolic representation of an indicium outline as stored in the matrix of FIG. 3 and the progressive rearrangement of the stored data.

Figure 1:
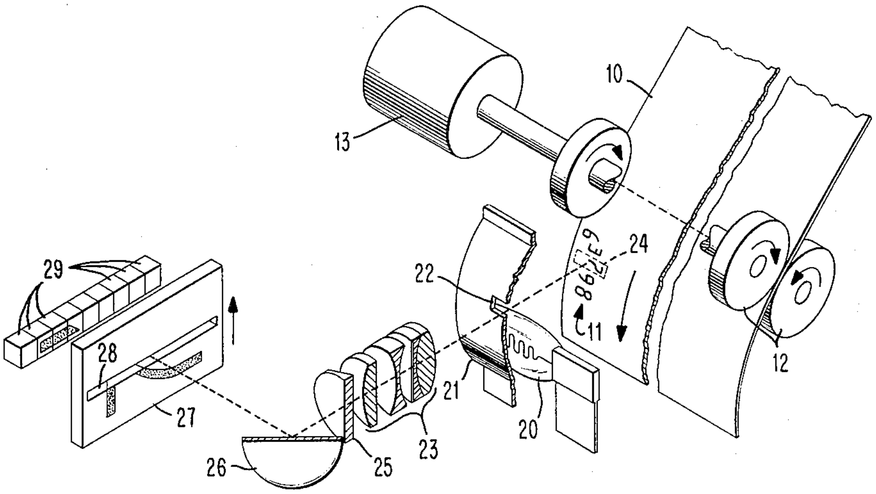
FIGURE 1 is a perspective view of the scanning apparatus of an indicium recognition device illustrating the essential features of the invention.

Referring to FIG. 1, a record card 10 having a line of printed indicia 11 thereon is moved by conventional transport means such as feed rolls 12, driven by motor 13, along a path in the direction of the arrow. The printed indicia and record background are of the usual contrasting colors. Adjacent record 10 is a light source 20, such as a quartz iodine lamp, and a reflector 21 which directs light toward record 10 to uniformly illuminate an area of the record which is to be optically scanned. An aperture plate or lens may be used if desired to confine the illumination to a discrete record area. Reflector 21 is provided with an aperture 22 to restrict extraneous light at a lens 23. That portion of the record surface which is imaged by the lens may be designated the scan or character area 24 and will remain fixed as the record 10 moves along its path. Light reflected from the record surface passes through aperture 22 and enters lens 23 which directs it through a biprism 25 or pair of optical wedges to a mirror 26 (used here merely to fold the optical path) and focuses it on mask 27 and slot 28. Mask 27 is entirely opaque except for slot 28 which may be cut in the mask or be only a transparent portion thereof. Directly behind slot 28 and in alignment therewith is a row of photoelectric transducers 29, which convert the light passing through the slot into electrical energy. The projected image is preferably magnified to permit the convenient use of conventional transducers such as semiconductor solar cells.

Thus, as record 10 is moved downwardly in the direction of the arrow, the various indicia in the line of printing 11 moves successively into and through character area 24 and the record background reflects light from source 20 through aperture 22 into lens 23 which directs it through biprism 25 to mirror 26 and onto mask 27. The record movement causes the projected image to also move across mask member 27 in the direction of the arrow and pass across transparent slot 28. As the image moves across slot 28, various ones of transducers 29 will experience a change in light intensity and indicate the change from the normal light received by producing a correspondingly varying electrical output signal. The output signals of the transducers are fed to suitable shaping circuits and supplied as input signals to a storage matrix where identification occurs and which will be described in more detail hereinafter.

No scanning difficulty exists when each indicium on record 10 is printed in proper horizontal alignment such as the characters "3", "9", and "8", shown in indicia line 11. However, due to the tolerances permitted in the printing, feeding or scanning mechanisms, the characters when actually sensed may be displaced in either direction from the desired horizontal alignment as illustrated by the "6" located below horizontal alignment, and the "7" located above the desired horizontal alignment. In order to sense these displaced indicia the scanned character area 24 must be large enough to include indicia located at either extreme of misalignment. Therefore, if the character area 24 was approximately two times the actual height of an indicium to accommodate the extremes of misalignment, mask member 27 and slot 28 would necessarily be enlarged in their longitudinal direction to approximately twice the dimension shown. This alteration would necessitate twice as many transducers 29 because each unknown scanned image would have to be identified by a fixed number of information signals for proper identification by known characteristics. The increased quantity of transducers further necessitates additional circuits and electrical components.

Figure 2:
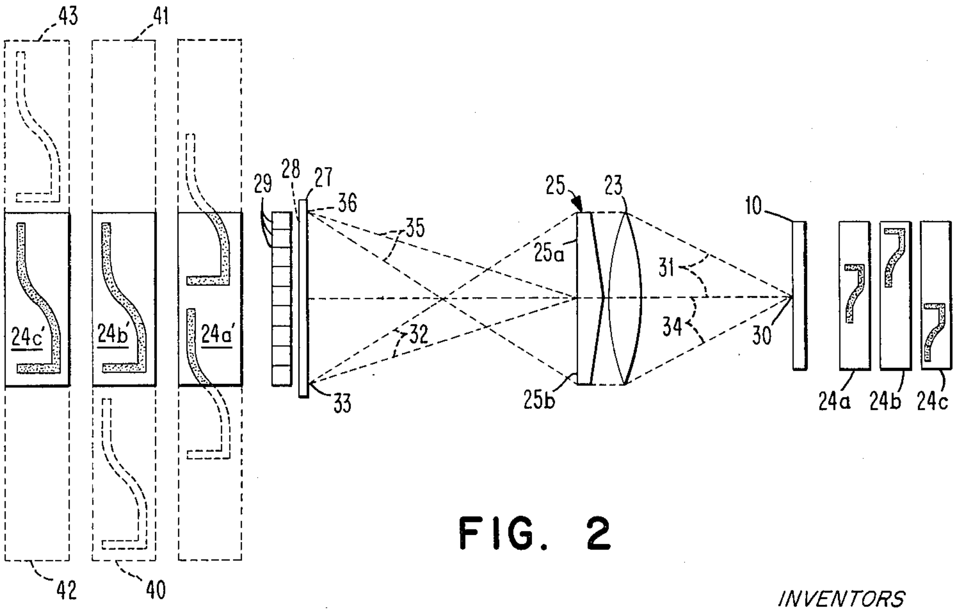
FIGURE 2 is a schematic diagram of the resulting superimposition of scanned character areas effected with the use of the biprism as shown in FIG. 1.

The necessity of using an enlarged mask and slot, and additional transducers and circuits therefor to accommodate printing misalignment is overcome by including in the optical path a biprism 25 or pair of optical wedges as mentioned above. The biprism, which splits the lens aperture, may be placed either before or after lens 23 in the optical path and is used as a light control device to superimpose opposite halves of the imaged character area 24 at mask 27, as shown in FIG. 2. This figure illustrates the image location relative to mask 27 that results when the indicium "7" is properly aligned, or downwardly or upwardly displaced from proper alignment in the scanned character area 24.

In the figure, there are schematically illustrated card 10, lens 23, biprism 25, mask 27 and transducers 29 as shown in FIG. 1. When a character area 24 is scanned, light is reflected to the left in the figure from the surface of the card through the lens and biprism to mask 27 and slot 28. Dark image areas so projected pass through the slot and decrease the light striking particular transducers as the image moves across the slot. The effect of the biprism may be understood by considering light reflected from the midpoint 30 of character area 24. Part of the reflected light diverges and passes between lines 31 through the upper half of lens 23 where it is inverted, and through portion **25*a* of the biprism which directs it downwardly so that it converges between lines 32 at image point 33. Similarly, another portion of the light reflected from point 30 diverges between lines 34 and passes through the lower half of lens 23 where it is inverted, and through portion 25*b* of the biprism which directs it upwardly to converge between lines 35 at image point 36 on the mask. The upper and lower half of the biprism each independently of the other, direct the light from all points of character area 24 to form images of the character area and indicium on mask 27. However, each image area is displaced from the horizontal in accordance with the angle and refractive index of the prism. The result illustrated is that, if point 30 is at the midpoint of area 24 and the light ray deviation from the horizontal produced by each of the prismatic portions 25*a* or 25*b* is one quarter of the magnified and projected character area image, upper and lower halves of the imaged areas will be superimposed on mask 27**. The non-superimposed fractional image areas do not strike the mask but pass either above or below the mask.

The partial superimposition of character areas used in conjunction with the scanning of an indicium may be described by considering the exemplary indicium "7" shown aligned and misaligned in two extremes within character areas **24*a*, 24*b* and 24*c*. The resulting projected images in each instance are shown in the respective magnified and partially superimposed character areas 24*a*', 24*b*' and 24*c*'. In character area 24*a*, the "7" is properly aligned so that, upon projection through portion 25*a* only of the biprism, the "7" image appears partially within area 24*a*' and partially below that area. Upon projection through prismatic portion 25*b* only, the "7" image falls partially within area 24*a*' and partially thereabove. Thus, when the original printed character is properly aligned on the record, its image will be complete within character area 24*a*', although discontinuous. Therefore, since an entire image of the aligned "7" appears within this space, transducers 29** are necessary for sensing only the superimposed area because a single complete image exists.

The discontinuity of the image does not present any recognition difficulty since the information signals representing the image may be reorganized in the storage matrix. The reorganization is accomplished by supplying the transducer signals to a storage matrix or shift register and "rolling" the storage matrix to obtain periodic rearrangement of the stored information. Comparison of the unknown stored pattern and with the criteria of known indicia occurs simultaneously with each image rearrangement.

The effect of the biprism on misaligned indicia may be considered by referring to character areas **24*b* and 24*c* and their respective images at 24*b*′ and 24*c*′. When the indicium "7" is printed at the upper extreme of the character area 24*b*, lens 23 and prismatic portion 25*a* produce an inverted image of the object character area so that an image of the "7" is displaced downwardly below character area 24*b*′. The entire image of character area 24*b* appears between the upper limit of area 24*b*′ and the lower limit of the region bounded by the broken line 40. Because of the original misalignment of the "7", an image thereof will appear in area below the mask. However, the image of area 24*b* produced by the lens and lower prismatic portion 25*b* is also inverted but displaced upwardly so that a "7" image falls entirely within area 24*b*′ and the remainder of the imaged character area falls in region 41. Similarly, when the indicium "7" is printed originally in an extreme low position as shown by character area 24*c*, the images thereof produced by the lens and biprism are superimposed at image area 24*c*′. Again, the non-superimposed image areas fall in the regions bounded by broken lines 42 and 43**.

By using the biprism, a complete image of a properly aligned or misaligned recorded indicium may be produced within a designated area regardless of the original alignment of the indicium. As a result, photoelectric transducers are required to sense only the image appearing in character areas **24*a*′, 24*b*′ or 24*c*′**, which permits the elimination of additional transducers required to sense the entire imaged character area which would be twice the height of that actually shown.

It will be recalled, with reference to FIG. 1, that the signals representative of the imaged indicium are obtained by moving the image across mask member 27 and transparent slot 28 so that the entire image will pass across transducers 29. The transducers each produce an electrical output signal in response to the quantity of light falling thereon. For example, if the transducer is shaded by a portion of the projected indicium image its output signal will decrease, and conversely when a shaded transducer senses increased light its output signal increases. The information thus produced by the transducers is used to supply coded data representative of the indicium scanned which must be subsequently decoded and compared with predetermined data patterns for proper identification.

The manner in which these transducer signals are used to accomplish identification of the coded indicium image will be briefly described with reference to FIGS. 3 and 4. This recognition circuit is merely an example of one which may be used and is similar to the circuit described in the "IBM Customer Engineering Manual of Instruction" for the type "1210 Reader-Sorter," copyright 1960 by International Business Machines Corporation. The principal difference between the present circuit and that of the publication is that the coded input data for the circuit of the publication is supplied from magnetic rather than photoelectric transducers. In FIG. 3, only five of the nine transducers 29 are shown to simplify the drawing and these transducers are designated with suffixes 1, 2, 3, 8 and 9 to indicate particular transducers. Each transducer is connected directly to a respective one of a plurality of well-known shaping circuits 50, 51, 52, 53 and 54 which include suitable amplifying, integrating and limiting circuits. The output of each shaping circuit is supplied as an input to one of the rows of a storage matrix 61 which may be composed of conventional bi-stable triggers appropriately interconnected between the individual stages to permit the transfer of information in a vertical direction according to the energization of control circuits.

The storage device is composed, for example, of nine horizontal rows of triggers, rows 1 through 9, of which only five are shown, and five vertical columns, columns A through E, to form a nine by five matrix which can indicate the configuration of the sensed indicium image by the pattern of triggers which are on. The matrix layout is shown in FIG. 4 schematically and illustrates the function of the storage matrix to indicate the image-background pattern sensed by the transducers. The individual boxes marked with an "X" therein indicate the triggers that are on and have image information stored.

The storage matrix is "loaded" by supplying the output signals, which may be merely voltage levels, from each shaping circuit to all of the triggers in the matrix row corresponding to the particular shaping circuit. As the image progresses across the photoelectric transducers 29–1 through 29–9, the voltage level outputs from the shaping circuits will vary in accordance with the quantity of light striking the transducers. Data entry in the appropriate triggers of a row is synchronized with image movement by successively applying set pulses to all the triggers in each vertical column by horizontal shift circuits, indicated generally as 62. The horizontal shift circuits apply a set pulse to all of the triggers in a column and are able to turn on only those triggers that are conditioned by a transducer signal. Each matrix column is set in succession as the image moves so that the image is represented by five horizontal increments. Therefore, should shaping circuit 50 produce an "up" level output to condition the trigger designated Row 1, column A, and a set pulse appears from the horizontal shift circuits while the "up" level from shaping circuit 50 exists, that trigger would be turned on. Similarly, if the output from shaping circuit 50 remained "up" during the entire scan of an indicium, all of the triggers in Row 1 would be successively turned on as the horizontal shift circuits successively applied set pulses to the columns A through E. The horizontal shift circuits may comprise a multivibrator and counting ring to provide the successive columnar pulses required.

Each shaping circuit output is also supplied to a character detector 63, which produces an initiating pulse to the horizontal shift circuits when two transducers simultaneously sense a portion of an indicium image. The character detector output serves as a control signal to initiate the operation of the horizontal shift oscillator and storage matrix when an image is first detected. Thus, as the image continues to move past the transducers each vertical column of triggers is successively set according to the transducer signal levels present, until the timing ring completes a cycle which is the time required for the entire image to move past the transducer.

FIGURE 4*a* illustrates the appearance of the image pattern stored in the matrix after completely scanning, for example, the discontinuous "7" image shown in FIG. 2 in character area **24*a*′. The inversion of the image in FIG. 2 is corrected by altering the inputs of the transducers to the shaping circuits. Because the image is discontinuous as scanned, it will initially appear in the same arrangement in matrix 61**. In order to properly identify the stored pattern, the matrix must be "rolled" to present a recognizable pattern.

"Rolling" is accomplished in a well-known manner by utilizing a vertical shift circuit 64 which is activated upon a completion of the timing ring cycle in the horizontal shift circuits. When the timing ring of the horizontal shift circuits concludes its pulse to column E, a multivibrator is activated within vertical shift circuits 64 which applies a succession of nine pulses to all of the triggers in the matrix. The outputs of each trigger are supplied to the inputs of the trigger directly above it as conditioning signals and when a pulse occurs from the vertical shift circuit, the trigger above will assume the same state as that immediately below. It will be noted that the outputs of the triggers in Row 1 are supplied as gating inputs to the triggers in Row 9 of the respective columns. The result of rolling the matrix is partially shown in FIGS. 4*a*–4*d*. The rolling in FIG. 4 has been carried only far enough to show that the discontinuous "7" image has been reformed into a recognizable "7" as shown in FIG. 4*d*. However, in actual recognition of an indicium, a matrix is rolled completely because the location and discontinuity of the scanned image cannot be determined beforehand.

Identification of the stored image occurs through the use of recognition logic circuits 65 which sense the stored information at each increment of roll to determine whether the pattern meets the designated criteria of any known indicium. The recognition circuits generally include a plurality of AND circuits each connected to the matrix trigger outputs in predetermined combinations representative of a particular known indicium. When all the inputs to one of the AND circuits are positive, for example, that AND circuit will provide a recognition signal indicating that the stored pattern met the criteria of its known indicium. Thus, the arrangement of the information bits stored in the matrix during the initial image scan is not necessarily the arrangement considered for recognition. Because the stored information is "rolled," the scanned image may be continuous or discontinuous.

It is to be noted from the above description that the size of the matrix and number of transducers used to sense image increments may vary from that shown so as to be increased or decreased as the particular recognition application requires. The apparatus provided will be determined to a large extent by the character area to be scanned and printing misalignment encountered.

While the invention has been particularly shown and described with reference to a preferred embodiment thereof, it will be understood by those skilled in the art that various changes in form and details may be made therein without departing from the spirit and scope of the invention.

What is claimed is:

1. Imaging apparatus comprising:
means for directing light to an object having varying light reflective quality;
an image receiving member;
means adjacent said reflective object for collecting portions of said light reflected therefrom and forming an image thereof on said receiving member; and
optical means between said object and said member for controlling said reflected light to produce partial superimposition of said image upon itself at said member.

2. In a device for determining by its image the identity of an indicium recorded within a predetermined area on a record member, optical apparatus comprising:
means for illuminating said indicium and said area;
an image receiving member;
means optically aligned with said illuminated area and said indicium therein for forming an image of said area and said indicium on said member; and
light control means interposed between said image forming means and said member for superimposing a predetermined portion of said area image on itself on said image receiving member.

3. In a device for determining by its image the identity of an indicium recorded within a designated area on a record member, optical apparatus comprising:
an image receiving member;
lens means for forming an image of said designated area and said indicium on said member; and
means optically aligned with said lens means for splitting the aperture of said lens means and producing a plurality of images having predetermined portions thereof superimposed on said member.

4. Apparatus as described in claim 3 wherein said last-mentioned means comprises a biprism for producing a pair of partially superimposed images.

5. In apparatus for determining by its image the identity of an indicium recorded within a designated area on a record member, image sensing apparatus comprising:
means for illuminating said area and indicium therein;
lens means optically aligned with said illuminated area for projecting an image of said area and indicium along an optical path;
optical wedges in said optical path for producing from said projected image a pair of superimposed image portions at a predetermined focal distance; and
a plurality of photoelectric transducers at said predetermined focal distance upon which said superimposed image portions fall.

6. In apparatus for determining by its image the identity of an indicium recorded within a designated area on a record member, image sensing apparatus comprising:
means for illuminating said area and indicium therein;
lens means optically aligned with said illuminated area for projecting an image of said area and indicium along an optical path;
a plurality of optical wedges in said path for producing a plurality of superimposed image portions at a predetermined focal distance from said lens; and
a plurality of photoelectric transducers at said predetermined focal distance upon which only said superimposed image portions fall, causing said transducers to produce varying electrical signals in response to the quantity of light falling thereon.

7. Apparatus as described in claim 6 further including identification means responsive to said electrical signals for determining the identity of said imaged indicium.

8. In a device for determining by its image the identity of an indicium recorded within a predetermined area on a record member, optical apparatus comprising:
means for illuminating said indicium and said area;
a mask member;
lens means optically aligned with said illuminated area and said indicium for projecting an image of said area and indicium along an optical path; and
a biprism disposed in said path for superimposing opposite halves of said projected image on each other at said mask member.

9. In an indicium identification device, apparatus for scanning an indicium recorded in a recorded area comprising:
means for illuminating said recorded indicium and said area;
a plurality of photoelectric transducers for providing electrical output signals proportional to the light falling thereon;
lens means aligned with said indicium for projecting an image of said indicium and said area along an optical path onto said transducers;
optical means disposed in said path for superimposing portions of said imaged area upon itself on said transducers; and
means for utilizing the electrical output signals produced by said transducers when said superimposed image portions fall thereon.

10. Apparatus as described in claim 9 wherein said optical means comprises a biprism.

11. A device for determining by its image the identity of an indicium recorded within a predetermined area on a record member comprising, in combination:
means for illuminating said indicium and said area;
a plurality of photoelectric transducers for providing electrical output signals in accordance with the light falling thereon;
lens means optically aligned with said illuminated area and said indicium for forming an image of said area and said indicium on said transducers;

optical means interposed between said lens means and said transducers for superimposing predetermined portions of said imaged area on itself on said transducers; and identification means associated with said transducers for determining the identity of said indicium image.

12. In a device for determining by its image the identity of an indicium recorded within a predetermined area on a record, recognition apparatus comprising, in combination:

means for transporting to said record along a fixed path;

means adjacent said record for illuminating said area and said indicium;

a mask member having an aperture therein;

a plurality of photoelectric transducers aligned with said aperture for producing electrical signals in accordance with the quantity of light falling thereon;

lens means aligned with said record for projecting an image of said area and said indicium along an optical path;

a plurality of prisms disposed in said optical path for producing multiple images and partially superimposing said multiple images on each other on said mask member and said transducers; and identification means responsive to said transducer signals for indicating the identity of said indicium image in said superimposed record area images.

13. A device for determining by its image the identity of an indicium recorded within a designated area on a record member comprising, in combination:

means for illuminating said designated area;

a mask member having an aperture therein;

a plurality of photoelectric transducers aligned with said aperture for producing signals in accordance with the light thereon;

lens means for creating an image of said designated area and said indicium on said mask member;

means optically aligned with said lens means for splitting the aperture of said lens means and producing from said image a plurality of images having predetermined portions thereof superimposed on each other on said mask member and said transducers to vary the light thereon; and means responsive to said transducer signals for determining the identity of said indicium from its image on said mask member.

14. In apparatus for producing an image of an indicium record within a predetermining area of a light reflective record member, the combination comprising:

means for illuminating said predetermined area;

an image receiving element;

means for projecting an image of said area and said indicium along an optical path; and optical control means in said path for superimposing portions of only said area image upon itself on said element without superimposing portions of said indicium image upon itself on said element.

References Cited by the Examiner

UNITED STATES PATENTS

| | | | |
|---|---|---|---|
| 1,864,753 | 6/1932 | Nicolson | 88—57 |
| 2,157,099 | 5/1939 | Rosenhauer | 88—57 |
| 2,927,216 | 3/1960 | Lohninger | 340—146.3 |
| 2,968,793 | 1/1961 | Bellamy | 340—146.3 |

MALCOLM A. MORRISON, *Primary Examiner.*

S. M. URYNOWICZ, J. E. SMITH, *Assistant Examiners.*